UNITED STATES PATENT OFFICE.

MICHAEL B. BAILEY, OF CHICAGO, ILL., ASSIGNOR, BY MESNE ASSIGNMENTS, OF ONE-HALF HIS RIGHT TO HENRY P. TAYLOR, OF SAME PLACE.

IMPROVEMENT IN PAINTS.

Specification forming part of Letters Patent No. 207,096, dated August 20, 1878; application filed March 23, 1878.

*To all whom it may concern:*

Be it known that I, MICHAEL B. BAILEY, of the city of Chicago, in the county of Cook and State of Illinois, have invented a new and Improved Water-Proof and Elastic Paint; and I hereby declare the following to be a full, clear, and exact description thereof.

My invention relates to a paint applicable to all of the great variety of purposes for which paints of the above class are used, but adapted especially for the coating of composition-roofs; and it consists of a composition formed of the substance known in the trade as "candle-tar" or "sperm-gum" with petroleum, benzine, naphtha or turpentine, gum-shellac, gutta-percha, india-rubber, and litharge, in the manner and in the proportions hereinafter fully set forth.

The substance candle-tar or sperm-gum is the residuum left in refining the material used in the manufacture of sperm candles. It is of about the consistency of common pitch, which it also resembes in appearance; but it will not ignite.

For the manufacture of my paint, I take, say, twenty pounds of this candle-tar and boil it in a caldron until it becomes reduced to a thin liquid state. I then add about one gallon of either petroleum, benzine, or turpentine, the purpose of which is to cut the candle-tar or prevent its thickening beyond the required degree on cooling, and also to serve as a solvent for the gums and gum-resin named below. Any other suitable liquid hydrocarbon may be employed instead of either of those given. To this mixture, while still boiling, I add about one-fourth of a pound of gum-shellac, one-half an ounce of gutta-percha, and one-half a pound of india-rubber, all previously melted, and continue the boiling until all the ingredients are intimately mixed together. It will be found advantageous to stir the mixture occasionally during the process of boiling, especially after the adding of any fresh ingredient. After the whole has been sufficiently boiled, which is ordinarily at the end of about eight hours, I remove it from the fire and allow it to cool, and when it has become quite cool I stir in about one-quarter of a pound of lithage as a drier.

The above quantities suffice for about four gallons of paint.

This paint forms a valuable accessory to my improved roofing composition for which Letters Patent of the United States No. 200,122 were granted to me February 12, 1878; and for this and similar purposes the above proportions yield the proper consistency. When a thinner consistency is desired, as for house-painting, car-painting, and the like, the proportion of turpentine or its equivalent may be increased. I do not limit myself to exact proportions as to any of the ingredients; but I recommend, especially when a roof-paint is wanted, that they approximate closely those above given.

It will be noticed that nearly all the ingredients are both impervious to moisture and highly elastic. For this reason my paint not only serves as an excellent preservative of that to which it is applied, but it is also peculiarly durable in itself, not wearing away or cracking under the influence of the weather, or the expansion or shrinkage, within ordinary limits, of the material beneath it.

What I claim as new, and desire to secure by Letters Patent, is—

A paint composed of the following ingredients, to wit: candle-tar or sperm-gum, petroleum, benzine, turpentine, or other suitable liquid hydrocarbon, gum-shellac, gutta-percha, india-rubber, and litharge, substantially as described.

MICHAEL B. BAILEY.

In presence of—
GEORGE LILL,
MICH. PETRIE.